United States Patent [19]
Cheng et al.

[11] Patent Number: 5,599,632
[45] Date of Patent: Feb. 4, 1997

[54] CARBON SEEDLAYER ON NON-METALLIC SUBSTRATES FOR MAGNETIC RECORDING MEDIA

[75] Inventors: Yuanda Cheng; Richard A. Gardner, both of San Jose; Mojtaba Sedighi, Fremont, all of Calif.

[73] Assignee: Akashic Memories Corporation, San Jose, Calif.

[21] Appl. No.: 435,440

[22] Filed: May 10, 1995

[51] Int. Cl.$^6$ ........................................ G11B 5/00
[52] U.S. Cl. ........................ 428/457; 428/611; 428/623; 428/626; 428/667; 428/675; 428/693; 428/928; 428/428
[58] Field of Search ................. 428/928, 611, 428/675, 667, 621, 622, 623, 624, 626, 428, 448, 450, 480, 693, 457

[56] References Cited

U.S. PATENT DOCUMENTS

| | | | |
|---|---|---|---|
| 4,735,840 | 4/1988 | Hedgcoth | 428/65 |
| 4,883,711 | 11/1989 | Shiroishi et al. | 428/336 |
| 4,894,133 | 1/1990 | Hedgcoth | 204/192 |
| 5,069,983 | 12/1991 | Nakamura et al. | 428/694 |
| 5,080,948 | 1/1992 | Morita et al. | 428/64 |
| 5,082,747 | 1/1992 | Hedgcoth | 428/611 |
| 5,087,481 | 2/1992 | Chen et al. | 427/129 |
| 5,094,898 | 3/1992 | Morita et al. | 428/64 |
| 5,119,258 | 6/1992 | Tsai et al. | 360/135 |
| 5,134,038 | 7/1992 | Baseman et al. | 428/611 |
| 5,135,808 | 8/1992 | Kimock et al. | 428/336 |
| 5,153,044 | 10/1992 | Chen et al. | 428/64 |
| 5,268,217 | 12/1993 | Kimock et al. | 428/216 |
| 5,275,850 | 1/1994 | Kitoh et al. | 427/577 |
| 5,316,844 | 5/1994 | Suzuki et al. | 428/323 |
| 5,316,864 | 5/1994 | Hedgcoth | 428/611 |
| 5,356,522 | 10/1994 | Lal et al. | 204/192.5 |
| 5,413,873 | 5/1995 | Mizukami | 428/611 |

FOREIGN PATENT DOCUMENTS

WO88/05953 8/1988 WIPO.

*Primary Examiner*—David A. Simmons
*Assistant Examiner*—Linda L. Gray
*Attorney, Agent, or Firm*—Townsend and Townsend and Crew LLP

[57] ABSTRACT

A magnetic recording medium comprising a non-metallic substrate having a seedlayer thereon of carbon or silicon. The seedlayer improves the magnetic recording characteristics of a subsequent magnetic layer by smoothing out irregularities on the non-metallic substrate surface such that a surface of the seedlayer adjacent the magnetic layer is smoother than the surface of the substrate.

12 Claims, 3 Drawing Sheets

CARBON SEEDLAYER ON NON-METALLIC SUBSTRATES FOR MAGNETIC RECORDING MEDIA

BACKGROUND OF THE INVENTION

1. Field of the Invention

The present invention relates generally to magnetic recording media, and more particularly to magnetic recording disks formed on non-metallic substrates and methods for their production.

Thin film magnetic recording disks generally comprise a disk substrate having a magnetic layer and a number of underlayers and overlayers deposited thereon. The nature and composition of each layer is selected to provide desired magnetic recording characteristics as generally recognized in the industry. An exemplary present day thin film disk is illustrated in FIG. 1 and comprises a non-magnetic disk substrate 10, typically composed of an aluminum alloy. An amorphous nickel-phosphorous (Ni-P) underlayer 12 is formed over each surface of the disk substrate 10, typically by plating. The Ni-P layer is hard, and imparts rigidity to the aluminum alloy substrate. A second underlayer in the form of a chromium ground layer 14 is formed over the Ni-P layer 12, typically by sputtering, and a magnetic layer 16 is formed over the ground layer 14. The magnetic layer 16 comprises a thin film of a ferromagnetic material, such as a magnetic oxide or magnetic alloy. Usually, a protective layer 18, such as a carbon film, is formed over the magnetic layer 16, and a lubricating layer 20 is formed over the protective layer.

The amorphous Ni-P underlayer 12 effectively smoothes out the irregularities in the surface of an aluminum substrate. The presence of the Ni-P underlayer 12, together with the chromium ground layer 14, has been found to improve the recording characteristics of the magnetic layer 16. In particular, a chromium ground layer formed over a Ni-P layer provides enhanced coercivity and reduced noise characteristics. Such improvements are further enhanced when the Ni-P underlayer is treated by mechanical texturing to create a roughened surface prior to formation of the chromium ground layer. The texturing may be circumferential or crosswise, with the preferred geometry depending on the particular composition of the cobalt-containing magnetic layer.

The outer carbon protective layer 18 serves a very different purpose. This protective layer has been found to greatly extend the life of magnetic recording media by reducing disk wear. The use of carbon as a protective outer layer is known for both metallic and non-metallic substrates. Carbon has been shown to provide a high degree of wear protection with a thin protective layer.

Such magnetic recording disk constructions have been very successful and allow for high recording densities. As with all such successes, however, it is presently desired to provide magnetic recording disks having even higher recording densities. For reasons best explained elsewhere, recording densities can be improved by reducing the spacing between the recording transducer (read/write head) and the magnetic disk surface while the disk is rotating. Such close spacing, in turn, requires magnetic recording disks which have very flat surfaces and which are dimensionally stable so that the surfaces remain flat during use. To this end, the use of dimensionally stable non-metallic disk substrate materials has been proposed, such as glass, ceramics, glass-ceramic composites, carbon, carbon-ceramic composites, and the like.

Such non-metallic disk substrate materials, however, suffer from their own disadvantages. Although non-metallic substrates may have highly polished surfaces, they still benefit from such a layer to smooth out irregularities. Glass substrates, for example, must be chemically strengthened so that they can withstand manufacturing and use. One method used is to subject glass surfaces to potassium-sodium ion exchange process to strengthen the outer surfaces. Such strengthening causes irregularities in the glass surface which must be polished out. Any irregularities which are not smoothed out can compromise the improved mechanical characteristics of a non-metallic substrate.

For these reasons, it would be desirable to provide an improved magnetic recording disk having a seedlayer deposited on a non-metallic substrate which provided improved magnetic recording characteristics of a subsequent conventionally deposited magnetic layer. It would be particularly desirable if such a seedlayer provided the magnetic recording disks with the enhanced magnetic properties available for aluminum and other metallic disk substrates, as well as the improved mechanical characteristics derived from the non-metallic substrates. The seedlayer should smooth out the irregularities of a non-metallic substrate surface and should improve the recording characteristics of a subsequent magnetic layer when applied to a non-metallic substrate.

2. Description of the Background Art

International Patent Application No. WO 88/05953, describes the use of a protective carbon outer layer on a magnetic recording disk with an aluminum substrate. U.S. Pat. No. 5,153,044 also discloses an aluminum substrate disk having a protective carbon outer layer, and further discloses the use of a typical amorphous Ni-P underlayer with an aluminum substrate. A similar use of a protective carbon outer layer with a non-metallic substrate disk is suggested by U.S. Pat. No. 5,316,864. U.S. Pat. Nos. 5,135,808 and 5,268,217 disclose the application of a diamond-like carbon film directly to a glass substrate to provide an optically transparent wear resistant surface. Other examples of protective carbon outer layers for magnetic recording disks are found in U.S. Pat. Nos. 5,080,948; 5,087,481; and 5,134,038.

U.S. Pat. Nos. 4,735,840 and 5,316,864 disclose a magnetic recording media having a glass substrate and a sputtered chromium nucleating under layer below the magnetic layer. An apparatus and process for producing disks having such a chromium nucleating layer is disclosed in U.S. Pat. Nos. 4,894,133 and 5,082,747. U.S. Pat. No. 5,119,258 discloses a similar sputtered chromium underlayer on a metallic substrate. An exemplary adhesion layer of group IVB, VB, and VIB transition metals applied to non-metallic substrates is disclosed in co-pending U.S. patent application Ser. No. 08/001,379. U.S. Pat. No. 5,094,898 is of general interest.

SUMMARY OF THE INVENTION

The present invention provides magnetic recording media comprising a non-metallic substrate, over which a seedlayer film of carbon or silicon is formed. A magnetic layer may then be formed over the seedlayer in a conventional manner. In a preferred embodiment, the seedlayer will be sputtered carbon, ideally having a thickness between 50 Å and 400 Å.

Use of the carbon or silicon seedlayer is beneficial in a number of respects. The seedlayer helps to smooth out the irregularities of the non-metallic substrate, and thereby improves the magnetic recording characteristics. Surprisingly, a carbon seedlayer improves the signal to noise ratio with a specific improvement of 2 to 5 dB over similar recording media having other conductive seedlayers such as Cr, shown in the Experimental Section. In addition, glass recording media according to the present invention show higher amplitude, better resolution, and improvements in both pulse width and bit shift when compared to equivalent media having Cr seedlayers.

The non-metallic substrate may be composed of a variety of materials, including glass, ceramics, carbon, silicon, silicon carbide, and the like. An underlayer will normally be formed over the seedlayer and under the magnetic layer, preferably in the form of a ground layer, and a protective outer layer may also be formed over the magnetic layer, as is typical of magnetic recording media.

The present invention further provides a method for producing the magnetic recording media just described. Magnetic recording media according to the present invention are formed over non-metallic substrates by applying a carbon or silicon seedlayer directly over the substrate surface. A magnetic layer can then be formed over the seedlayer in the conventional manner. The seedlayer is preferably formed by sputtering carbon over the substrate surface to a thickness between 50 Å and 400 Å. The recording media will typically be formed by sputtering an underlayer over the seedlayer, then sputtering a magnetic layer over the underlayer, followed by sputtering a protective outer layer over the magnetic layer, with a final lubricating layer coating on the protective outer layer. Preferably, the underlayer comprises a ground layer formed by sputtering Cr, for example, over the seedlayer and before the magnetic layer.

DESCRIPTION OF SPECIFIC EMBODIMENTS

Figure 1:
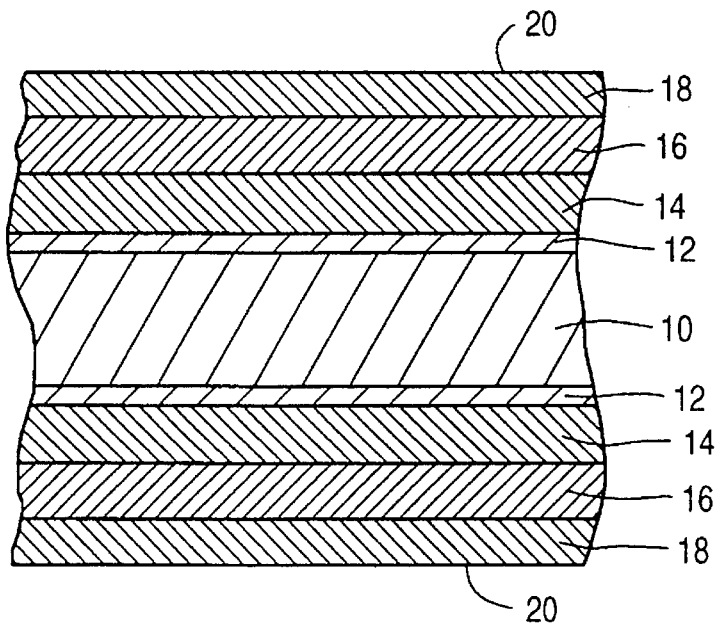
FIG. 1 is a cross-sectional view of an exemplary prior art magnetic recording disk having an aluminum disk substrate, as described in the Background section hereinabove.
Figure 2:
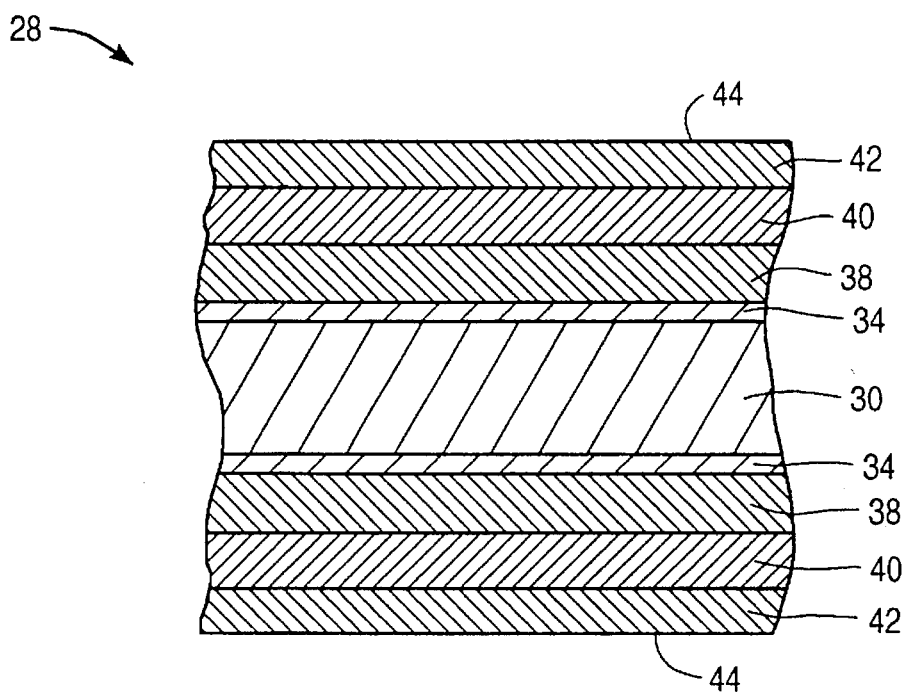
FIG. 2 is a cross-sectional view of a magnetic recording disk having a non-metallic disk substrate according to the present invention.

Referring now to FIG. 2, magnetic recording media according to the present invention will usually be in the form of a magnetic recording disk 28 comprising a non-metallic substrate 30, a seedlayer 34, a ground layer 38, a magnetic layer 40, a protective layer 42, and a lubricating layer 44. The various layers will be formed over at least one surface of the substrate 30, and preferably over both surfaces of the substrate 30, in the order illustrated. The non-metallic substrate 30 comprises a disk having a diameter suitable for formation of a conventional hard magnetic recording disk. Typically, the substrate 30 will be composed of glass, ceramic, carbon, glass-ceramic composites, glass-carbon composites, silicon, silicon carbide, and the like. Particularly preferred for use in the present invention is a glass substrate, such as the those available from Pilkington Micronics.

The seedlayer 34 will typically be a layer of either carbon or silicon, carbon being particularly suitable. A carbon seedlayer may be directly sputtered on the substrate surface. No electrical biasing is required for sputtering of the seedlayer, though the substrate is preferably heated prior to sputtering. The thickness of the seedlayer is typically in the range from about 50 Å to about 400 Å thick. Preferably, the carbon source used for sputtering will have a purity of at least about 99.9% purity, more preferably being at least about 99.99% purity, and even more preferably being 99.995% purity or higher. Such a carbon seedlayer has been found to have a dramatic effect on the magnetic recording characteristics of magnetic recording media having non-metallic substrates, as described below in the Experimental Section.

Alternatively, a silicon seedlayer may be used. The silicon seedlayer will also typically be sputtered to a thickness in the range from about 50 Å to about 400 Å. The silicon seedlayer is deposited using methods similar to those described regarding the carbon seedlayer. No bias need be applied, and heating of the substrate is optional, but not preferred.

The seedlayer 34 provides a base for the deposition of an underlayer, preferably in the form of a ground layer 38. Ground layer 38 will typically be chromium or a chromium alloy such as CrCu, CrB, or CrSi, which is deposited by sputtering onto the seedlayer. The ground layer will typically have a thickness in the range from about 100 Å to 2500 Å. The ground layer 38 further enhances the magnetic properties of the subsequently applied magnetic layer 40 by creating grain separation in the magnetic alloy.

The magnetic layer 40 is next applied over the ground layer 38, again typically by sputtering in a conventional manner. The magnetic layer will be composed of a cobalt-containing alloy, such as CoCrTaPtB, CoCrPtB, CoCrTa, CoPtCr, CoNiCr, core, and the like. The magnetic layer 38 may be a single layer or may comprise two or more layers formed over one another. The thickness of the magnetic layer 38 is not critical, typically being in the range from about 200 Å to 800 Å.

A protective layer 42 is next formed over the magnetic layer, typically being composed of carbon and having a thickness in the range from about 50 Å to 400 Å. The protective layer 42 will usually be coated with a lubricant layer 44, for example a fluorinated polyether or the like, typically having a thickness in the range from about 10 Å to 50 Å.

The following example is offered by way of illustration, not by way of limitation.

EXPERIMENTAL

Glass substrates (Pilkington Glass Disks 65 mm in diameter and 25 mil thick) were cleaned. One group of disks were heated and a 225 Å carbon seedlayer was sputter deposited. A second group of disks were moderately heated and a 1000 Å CrCu seedlayer sputter deposited (referred to as low heat Cr). A final group of cleaned disks was heated to a higher degree and also had a 1000 Å CrCu seedlayer sputter deposited (high heat Cr). The disks were then heated, each group of disks having a range of heat times, before a 1000 Å CrCu underlayer and then a 475 Å CoCrPtB 10-6-6 magnetic layer were sputter deposited over the seedlayers. A 225 Å carbon protective outerlayer was finally sputter deposited over the magnetic layer.

No electrical bias was applied for the seedlayer sputtering. A bias of −100 volts was applied for both the underlayer and the magnetic layer sputter depositions.

Figure 3:
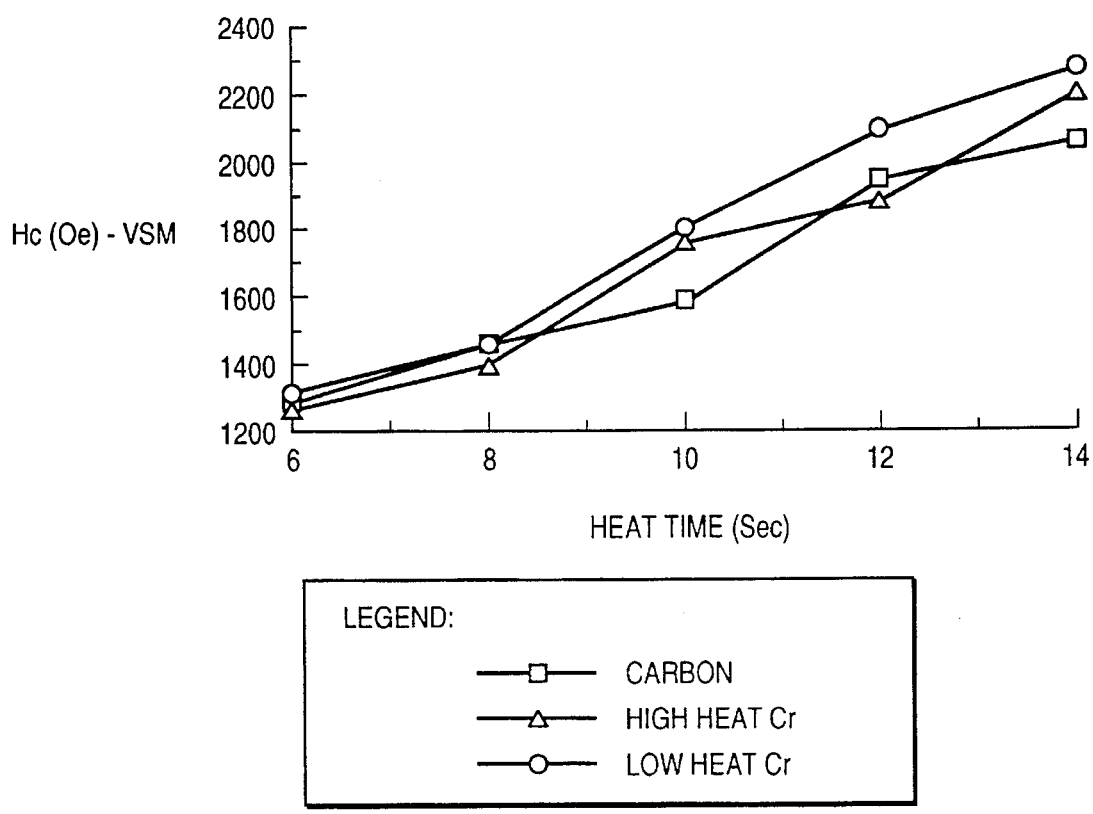
FIGS. 3–5 show experimental data, as described in detail in the Experimental section.
Figure 4:
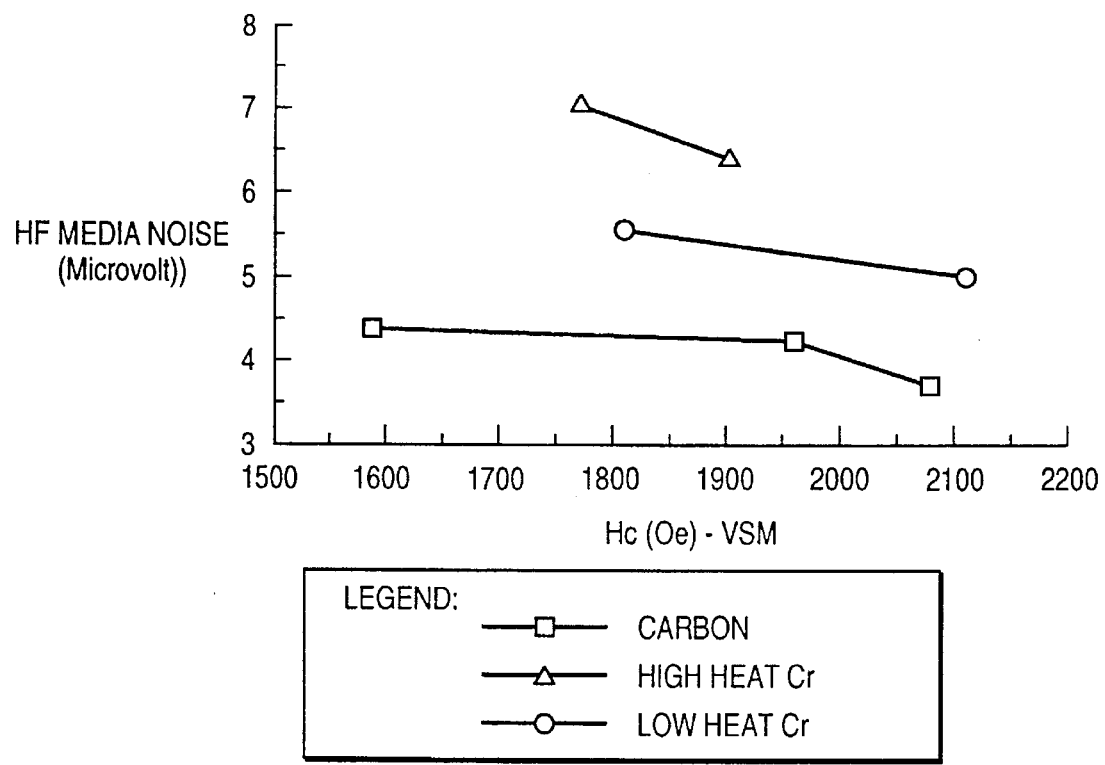

The three groups of disks were parametrically evaluated. Coercivity (Hc) varied with the heat time for each group of disks, as shown in FIG. 3. Noise was then plotted against coercivity for each group of disks, shown in FIG. 4. The disks having a carbon seedlayer can be seen to have a much lower noise level than the groups having CrCu seedlayers.

Figure 5:
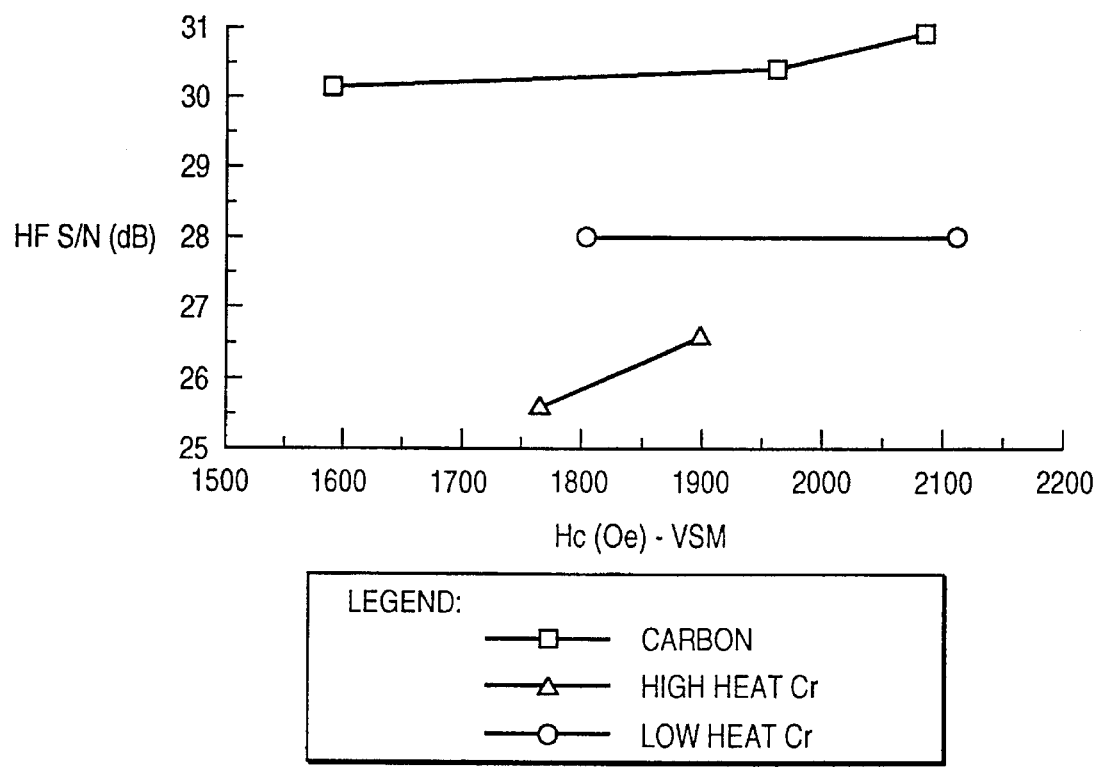

Finally, the group with the carbon seedlayer showed a 2 dB to 5 dB advantage in their signal to noise ratio. FIG. 5.

Although the foregoing invention has been described in some detail by way of illustration and example, for purposes of clarity of understanding, it will be obvious that certain changes and modifications may be practiced within the scope of the appended claims.

What is claimed is:

1. Magnetic recording media comprising:
   a non-metallic substrate having a surface with surface irregularities;
   a seedlayer selected from the group consisting of carbon and silicon formed over the surface of the substrate; and
   a magnetic layer over the seedlayer;
   wherein the seedlayer smoothes out the surface irregularities of the surface of the substrate so that a surface of the seedlayer adjacent the magnetic layer is smoother than the surface of the substrate.

2. Magnetic recording media as in claim 1, wherein the non-metallic substrate is composed of a material selected from the group consisting of glass, ceramic, carbon, silicon, and silicon carbide.

3. Magnetic recording media as in claim 2, wherein the seedlayer is sputtered carbon having a thickness in the range from 50 Å to 400 Å.

4. Magnetic recording media as in claim 3, wherein the carbon is sputtered from a carbon source having at least 99.9% purity.

5. Magnetic recording media as in claim 2, wherein the seedlayer is sputtered silicon having a thickness in the range from 50 Å to 400 Å.

6. Magnetic recording media as in claim 2, further comprising an underlayer formed over the seedlayer below the magnetic layer.

7. Magnetic recording media as in claim 6, wherein the underlayer is sputtered CrCu having a thickness in the range from 100 Å to 2500 Å.

8. Magnetic recording media as in claim 6, further comprising a protective layer and a lubricating layer formed over the magnetic layer.

9. Magnetic recording media comprising:
   a glass substrate having a surface which has been strengthened and then polished, wherein the surface retains irregularities from strengthening after polishing;
   a seedlayer of carbon sputter deposited over the substrate to a thickness in the range from 50 Å to 400 Å from a carbon source having at least a 99.9% purity;
   an underlayer comprising chromium sputter deposited over the seedlayer to a thickness in the range from 100 Å to 2500 Å;
   a magnetic layer over the underlayer;
   a protective layer over the magnetic layer; and
   a lubricating layer over the protective layer;
   wherein the seedlayer smoothes out the surface irregularities of the surface of the substrate so that a surface of the seedlayer adjacent the magnetic layer is smoother than the surface of the substrate.

10. Magnetic recording media as in claim 1, wherein the surface of the substrate has been strengthened by a strengthening process which produces the irregularities.

11. Magnetic recording media as in claim 10, wherein the surface of the substrate comprises a glass surface which has been strengthened by a potassium-sodium ion exchange process.

12. Magnetic recording media as in claim 10, wherein the surface of the substrate has been polished after being strengthened, and wherein the irregularities remain in the surface of the substrate after polishing.

* * * * *